United States Patent
Inou et al.

(10) Patent No.: US 8,401,714 B2
(45) Date of Patent: Mar. 19, 2013

(54) APPARATUS FOR SUPPORTING DRIVE OF MOBILE OBJECT BASED ON TARGET LOCUS THEREOF

(75) Inventors: Hiroshi Inou, Kariya (JP); Mamoru Sawada, Yokkaichi (JP); Seiji Totsuka, Tokai (JP)

(73) Assignee: Denso Corporation, Kariya (JP)

( * ) Notice: Subject to any disclaimer, the term of this patent is extended or adjusted under 35 U.S.C. 154(b) by 60 days.

(21) Appl. No.: 13/199,190

(22) Filed: Aug. 22, 2011

(65) Prior Publication Data

US 2012/0046802 A1 Feb. 23, 2012

(30) Foreign Application Priority Data

Aug. 23, 2010 (JP) .................................. 2010-186412

(51) Int. Cl.
  *G05D 1/00* (2006.01)
  *G05D 3/00* (2006.01)
  *G06F 7/00* (2006.01)
  *G06F 17/00* (2006.01)

(52) U.S. Cl. .............. 701/1; 701/41; 701/42; 701/65; 701/93; 701/96; 701/300; 701/301; 701/514

(58) Field of Classification Search ................. 701/1, 41, 701/42, 93, 96, 65, 300, 301, 514; 382/104
See application file for complete search history.

(56) References Cited

U.S. PATENT DOCUMENTS

| | | | | |
|---|---|---|---|---|
| 5,517,021 A * | 5/1996 | Kaufman et al. | ............. | 250/221 |
| 7,519,459 B2 * | 4/2009 | Ito et al. | ............. | 701/36 |
| 7,577,504 B2 * | 8/2009 | Sawada et al. | ............. | 701/38 |
| 7,616,782 B2 * | 11/2009 | Badawy | ............. | 382/107 |
| 7,656,313 B2 * | 2/2010 | Victor et al. | ............. | 340/995.26 |
| 8,280,588 B2 * | 10/2012 | Inou et al. | ............. | 701/41 |
| 2005/0200088 A1 * | 9/2005 | Sawada et al. | ............. | 280/5.507 |
| 2005/0209749 A1 * | 9/2005 | Ito et al. | ............. | 701/36 |
| 2009/0303158 A1 * | 12/2009 | Takahashi et al. | ............. | 345/7 |
| 2010/0036563 A1 * | 2/2010 | Inou et al. | ............. | 701/41 |
| 2010/0049375 A1 * | 2/2010 | Tanimoto | ............. | 701/1 |

FOREIGN PATENT DOCUMENTS

| | | |
|---|---|---|
| JP | 05-270368 | 10/1993 |
| JP | 07-156818 | 6/1995 |
| JP | 11-348696 | 12/1999 |
| JP | 3201094 | 6/2001 |
| JP | 2010-036777 | 2/2010 |

* cited by examiner

*Primary Examiner* — Khoi Tran
*Assistant Examiner* — Jorge Peche
(74) *Attorney, Agent, or Firm* — Harness, Dickey & Pierce, PLC

(57) ABSTRACT

In an apparatus for supporting drive of a mobile object, a curl component calculator projects relative motion of a environmental field in a coordinate system formed by modeling a retina sphere of a driver of the mobile object. The curl component calculator calculates each of rotational components of the projected relative motion of the environmental field around a corresponding driver's eye direction to the gaze point. A target trajectory setter sets, as a target trajectory of the mobile object, an equal-magnitude line connecting a part of the rotational components of the projected relative motion of the environmental field, the part of the rotational components having a same magnitude.

21 Claims, 6 Drawing Sheets

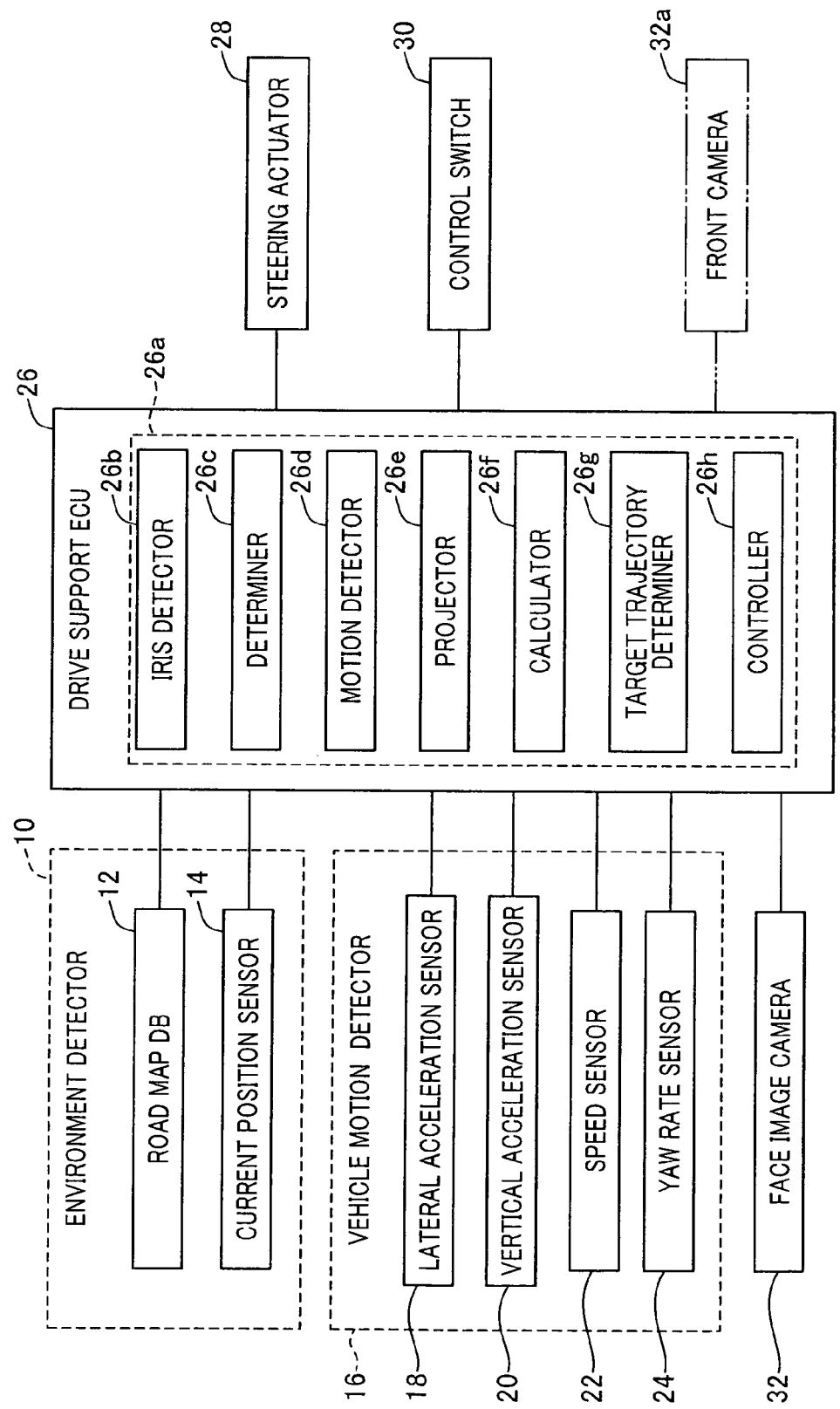

RUNNING ENVIRONMENTAL FIELD

DETERMINE THIS EQUAL-MAGNITUDE LINE AS TARGET TRAJECTORY

FIG.8 FUTURE POSITION OF VEHICLE ON EACH OF CURRENT AND TARGET TRAJECTORIES AFTER LAPSE OF N SECONDS
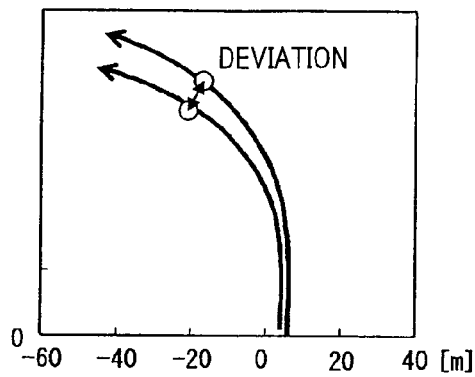
FIG.9
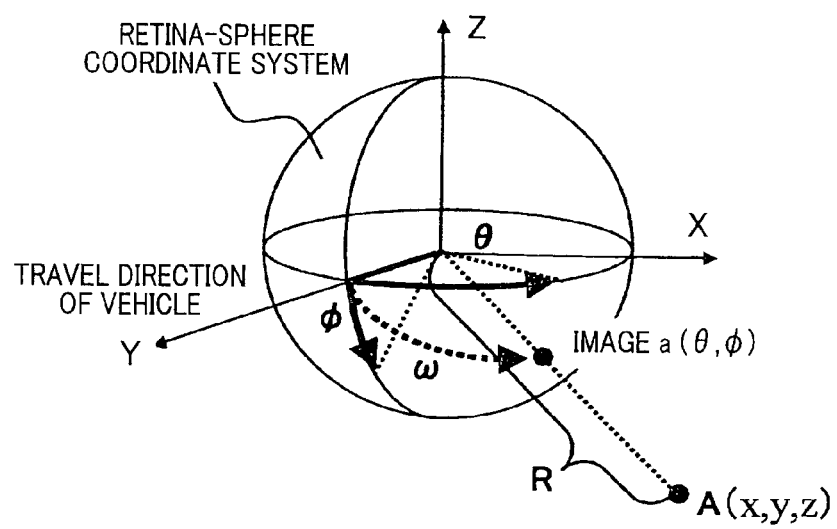
FIG.10
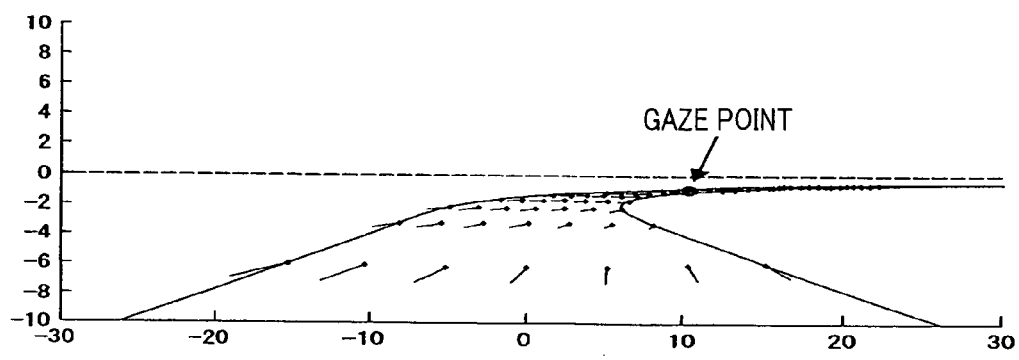

APPARATUS FOR SUPPORTING DRIVE OF MOBILE OBJECT BASED ON TARGET LOCUS THEREOF

CROSS REFERENCE TO RELATED APPLICATIONS

This application is based on Japanese Patent Application 2010-186412 filed on Aug. 23, 2010. This application claims the benefit of priority from the Japanese Patent Application, so that the descriptions of which are all incorporated herein by reference.

TECHNICAL FIELD

The present disclosure relate to apparatuses for setting a target trajectory (travel locus) of a mobile object, and for supporting the drive of the mobile object based on the set target trajectory.

BACKGROUND

The applicant of this application has already filed U.S. patent application Ser. No. 12/462,416 corresponding to Japanese Patent Application No. 2008-203410. US Patent Application publication No. 2010/0036563 of the US Patent Application corresponding to Japanese Patent Application Publication No. 2010-036777 discloses a travel support apparatus for a mobile object.

The travel support apparatus virtually sets, on an area around the mobile object, a plurality of reference points. Specifically, the travel support apparatus virtually sets, on a road on which the mobile object is expected to move, a plurality of rows of regularly spaced reference points. The travel support apparatus converts relative motion of each of the reference points with respect to the mobile object into relative motion of a corresponding reference point on a coordinate system formed by modeling a retina sphere of a driver of the mobile object. The relative motion of each reference point on the coordinate system with respect to the mobile object represents visual relative motion of a corresponding reference point with respect to the mobile object, in other words, motion information of each reference point relative to the mobile object on the retina of the driver.

Then, the travel support apparatus sets, based on the visual relative motion of each reference point with respect to the mobile object, a gaze point of the driver and a trajectory (a travel locus) of the mobile object.

Setting a trajectory of the mobile object based on the visual relative motion of each reference point with respect to the mobile object, which corresponds to the driver's visual recognition of a corresponding reference point, allows control of a trajectory of the mobile object; the controlled trajectory of the mobile object is matched with the driver's feeling. This suitably supports the driver's drive of the mobile object without causing discomfort of the driver.

SUMMARY OF THE INVENTION

The inventors have discovered that there is a point to be improved in the aforementioned patent publication. The travel support apparatus disclosed in the patent publication virtually sets, on the road on which the mobile object is travelling, a plurality of rows of regularly spaced reference points as candidate points of a travel locus of the mobile object with the reference points of each row being orthogonal to the length direction of the road. The travel support apparatus calculates the visual relative motion of each reference point with respect to the mobile object. Then, the travel support apparatus sets, as the gaze point, one reference point having the minimum visual relative motion in all of the reference points, and determines, as a trajectory point, one reference point having the minimum visual relative motion in all of the reference points in each row. The travel support apparatus connects the trajectory points of the respective rows of the reference points up to the gaze point to thereby determine the trajectory of the mobile object.

The trajectory determining method of the travel support apparatus set forth above can determine a proper trajectory of a mobile object if the mobile object turns in a steady-state condition (constant turning radius, constant steering angle, and constant speed) on a curve in a road. However, if the mobile object is turning on a curve in a road with its turning radius being changed, the position of the trajectory point in each row of the reference points may be laterally shifted. This lateral shift of the position of the trajectory point in each row of the reference points may cause the determined trajectory of the mobile object based on the trajectory points and the gaze point to be unsmooth. Thus, there is a requirement for properly determining a trajectory of a mobile object even if the mobile object turns with its turning radius being changed.

In view of the circumstances set forth above, one aspect of the present disclosure seeks to provide apparatuses for supporting drive of a mobile object, which are designed to address such a requirement set forth above.

Specifically, an alternative aspect of the present disclosure aims to provide such apparatuses for properly determining a target trajectory of a mobile object even if the mobile object turns with its turning radius being changed.

According to one aspect of the present invention, there is provided an apparatus for supporting drive of a mobile object. The apparatus includes a gaze point setter that sets a gaze point of a driver of the mobile object, a motion detector that detects relative motion of an environmental field around the mobile object with respect to the mobile object, and a curl component calculator. The curl component calculator projects the relative motion of the environmental field in a coordinate system, the coordinate system being formed by modeling a retina sphere of the driver of the mobile object, and calculates each of rotational components of the projected relative motion of the environmental field around a corresponding driver's eye direction to the gaze point. The apparatus includes a target trajectory setter that sets, as a target trajectory of the mobile object, an equal-magnitude line connecting a part of the rotational components of the projected relative motion of the environmental field, the part of the rotational components having a same magnitude, and a supporter that supports drive of the mobile object based on the target trajectory of the mobile object set by the target trajectory setter.

The inventors of this application has focused on the fact that, when the mobile object goes into a curve in a road from a straight portion therein, each component of curl of the projected relative motion dynamically changes depending on change of the shape of the road and change of the driver's gaze point. Specifically, if the road curves to the right so that the gaze point of the driver is set on the curve of the road, the magnitude levels of some of the curl components close to the right side of the road are larger than those of the remaining components, and the magnitude levels of the curl components are gradually reduced from the right side of the road to the left side thereof.

In contrast, if the road curves to the left so that the gaze point of the driver is set on the curve of the road, the magnitude levels of some of the curl components close to the left side of the road are larger than those of the remaining curl components, and the magnitude levels of the curl components are gradually reduced from the left side of the road to the right side thereof.

As described above, the distribution of the magnitude levels of the curl components dynamically changes depending on change of the shape of the road and/or change of the gaze point due to the change of the shape of the road. In addition, the distribution of the magnitude levels of the curl components varies from one side on the road in its width direction to the other side thereon. Thus, an equal-magnitude line connecting curl components that are the same as each other is suitable for the target trajectory of the mobile object.

Thus, according to the one aspect of the present disclosure, each of rotational components of the projected relative motion of the environmental field around a corresponding driver's eye direction to the gaze point is calculated. As a target trajectory of the mobile object, an equal-magnitude line connecting a part of the rotational components of the projected relative motion of the environmental field is set; the part of the rotational components having a same magnitude.

Thus, even if the mobile object turns with its turning radius being changed, it is possible to suitably determine the target trajectory of the mobile object based on the equal-magnitude line because the distribution of the magnitude levels of the curl components dynamically changes depending on change of the turning radius of the mobile object.

The above and/or other features, and/or advantages of various aspects of the present disclosure will be further appreciated in view of the following description in conjunction with the accompanying drawings. Various aspects of the present disclosure can include and/or exclude different features, and/ or advantages where applicable. In addition, various aspects of the present disclosure can combine one or more feature of other embodiments where applicable. The descriptions of features, and/or advantages of particular embodiments should not be constructed as limiting other embodiments or the claims.

BRIEF DESCRIPTION OF THE DRAWINGS

Other aspects of the present disclosure will become apparent from the following description of an embodiment with reference to the accompanying drawings in which:

FIG. 1 is a block diagram of a drive support apparatus according to an embodiment of the present disclosure;

FIG. 8 is a view schematically illustrating a timing at which the deviation between the curvature radius of the current trajectory is greater than that of the target trajectory according to the embodiment;

FIG. 9 is a view schematically illustrating a relationship between the orthogonal coordinate system and a retina-sphere coordinate system defined by the drive support ECU according to the embodiment; and FIG. 10 is a view schematically illustrating a gaze point, and an absolute value of an eccentric-angle change rate of each of the plurality of points according to the embodiment.

DETAILED DESCRIPTION OF EMBODIMENT

Figure 2A:
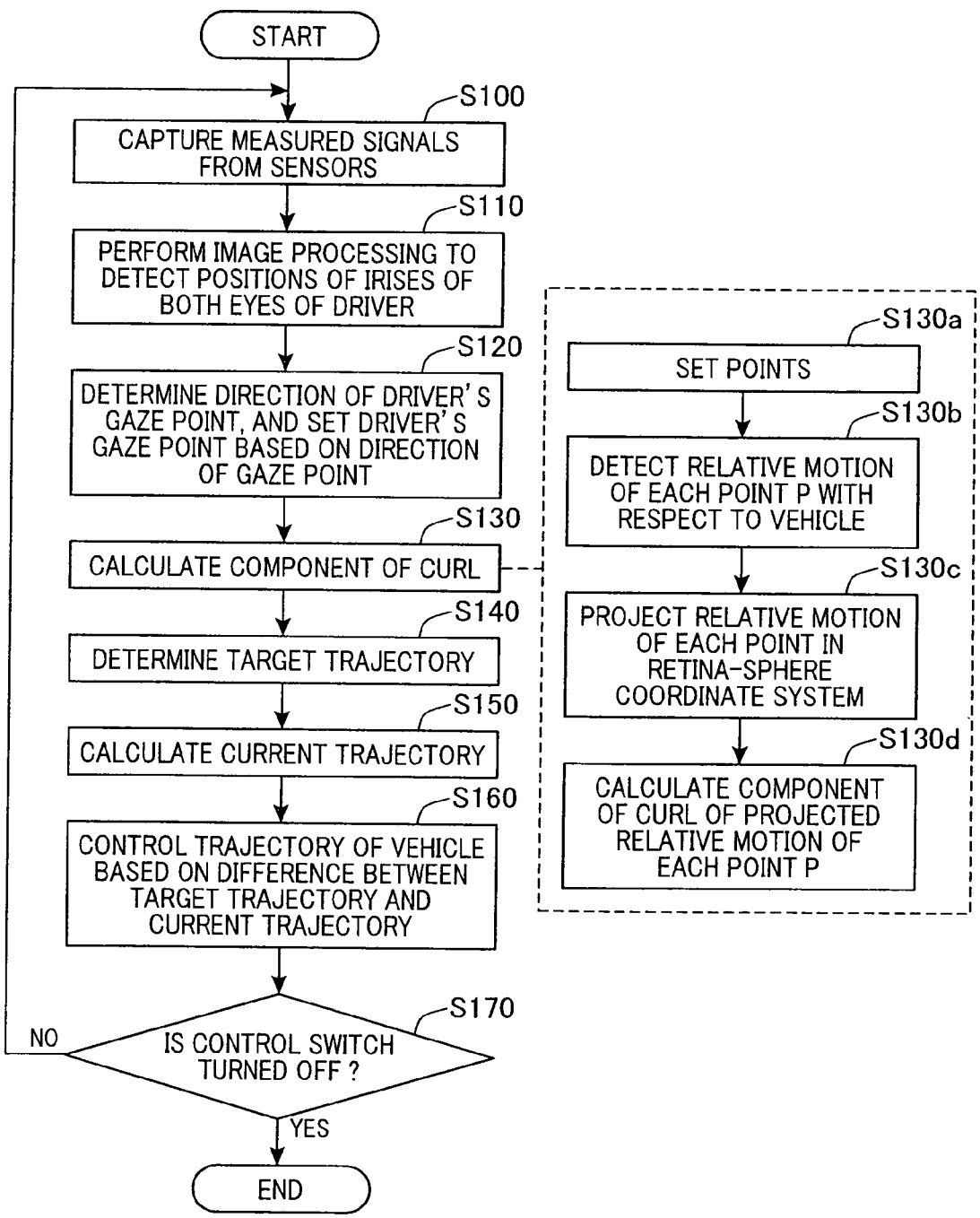
FIG. 2A is a flowchart schematically illustrating a drive support task to be executed by a drive support ECU illustrated in FIG. 1 according to the embodiment.

An embodiment of the present invention will be described hereinafter with reference to the accompanying drawings.

An example of the structure of an apparatus AP for supporting drive of a vehicle, such as a motor vehicle, which can run a road according to the present disclosure is illustrated in FIG. 1; this vehicle is an example of various mobile objects.

The apparatus AP installed in the vehicle includes an environment detector 10, a vehicle motion detector 16, a drive support ECU (Electronic Control Unit) 26, a steering actuator 28, a control switch 30, and a face image camera 32. Each of the elements 10, 16, 28, 30, and 32 is communicably connected with the drive support ECU 26.

The environment detector 10 includes a road map database 12 and a current position sensor, such as a GPS receiver, 14. The road map database (DB) 12 stores therein data of road map. The current position sensor 14 is operative to determine a current position of the vehicle. The environment detector 10 is operative to detect a running environmental field, such as a running area, around the vehicle, based on the road map data stored in the road map database 12 and the current position of the vehicle determined by the current position sensor 14. For example, the environment detector 10 is operative to measure, as the running environmental field around the vehicle, the shape of a road running in the direction of forward movement of the vehicle from the current position. The environment detector 10 is also operative to send the detected running environment field around the vehicle to the drive support ECU 26.

The vehicle motion detector 16 includes a lateral acceleration sensor 18, a vertical acceleration sensor 20, a speed sensor 22, and a yaw rate sensor 24.

The lateral acceleration sensor 18 is operative to measure the magnitude of motion of the vehicle in the lateral direction (width direction) of the vehicle, and output a signal indicative of the measured magnitude of motion in the lateral direction of the vehicle to the drive support ECU 26.

The vertical acceleration sensor 20 is operative to measure the magnitude of motion of the vehicle in the vertical direction (height direction) of the vehicle, and output a signal indicative of the measured magnitude of motion in the vertical direction of the vehicle to the drive support ECU 26.

The speed sensor 22 is operative to measure the speed of the vehicle, and output a signal indicative of the measured speed of the vehicle to the drive support ECU 26.

The yaw rate sensor 24 is operative to measure the yaw rate of the vehicle, and output a signal indicative of the measured yaw rate of the vehicle to the drive support ECU 26; the yaw rate is a rate of change in a turning angle of the vehicle in its turning direction.

The control switch 30 is designed to be operable by the driver. When turned ON by the driver, the control switch 30 sends, to the drive support ECU 26, a trigger signal to start a drive support task.

The face image camera 32 is operative to successively pick up face images of a driver of the vehicle, and successively output, to the drive support ECU 26, the face images successively picked thereby.

The drive support ECU 26 is designed as, for example, a normal microcomputer circuit consisting of, for example, a CPU, a storage medium 26a including a ROM (Read Only Memory), such as a rewritable ROM, a RAM (Random Access Memory), and the like, an IO (Input and output) interface, and so on. The normal microcomputer circuit is defined in this embodiment to include at least a CPU and a main memory therefor.

The storage medium 26a stores therein beforehand various programs.

The drive support ECU 26 includes, as functional modules, an iris detector 26b, a determiner 26c, a motion detector 26d, a projector 26e, a calculator 26f, a target trajectory determiner 26g, and a controller 26h. These functional modules can be implemented by executing a drive support program P included in the various programs described later.

The iris detector 26b is operative to detect the positions of the irises of both eyes (at least one eye) of the driver based on the successively picked-up face images.

The determiner (gaze setter) 26c is operative to determine, based on the positions of the irises, the direction of a gaze point of the driver to which the driver's line of sight is directed, thus setting the gaze point of the driver based on the determined direction of the gaze point of the driver.

The motion detector 26d is operative to detect, based on the measured signals of the respective sensors of the vehicle motion detector 16, the relative motion of the environmental field around the vehicle with respect to the driver.

The projector 26e is operative to project the relative motion of the environmental field around the vehicle in a three-dimensional coordinate system formed by modeling a retina sphere of the driver of the vehicle assuming that the driver observes the gaze point closely.

The calculator 26f is operative to calculate components of curl in the projected relative motion of the environmental field around the vehicle; a component of curl in the environmental field is a rotational component of the projected relative motion of the environmental filed around a corresponding driver's eye direction to the gaze point. That is, the calculator 26f is operative to obtain rotational components in the relative flow of the environmental field visually recognized by the driver; the rotational components of the relative flow of the environmental field are each relatively rotated around the gaze point with respect to the driver. How to calculate the rotational components will be described in detail later.

The target trajectory determiner 26g is operative to determine, as a target trajectory of the vehicle, an equal-magnitude (potential) line connecting rotational components that are the same as each other and extending in front of the vehicle.

The steering actuator 28 is operative to generate assist torque for assisting the driver's turning effort of a steering wheel of the vehicle.

The controller 26h is operative to calculate, based on the speed of the vehicle and the yaw rate measured by the speed sensor 22 and the yaw rate sensor 24, a current trajectory of the vehicle when, for example, the vehicle is turning on a curve in the road, and control the steering actuator 28 to adjust the assist torque such that the current trajectory of the vehicle is substantially matched with the target trajectory of the vehicle.

Next, the drive support task to be executed by the drive support ECU 26 in accordance with the drive support program P will be described hereinafter with reference to FIG. 2A. For example, the drive support task is started by the drive support ECU 26 in response to receiving the trigger signal from the control switch 30, and cyclically executed as long as the trigger signal being ON, in other words, the control switch 30 is ON.

First, the drive support ECU 26 captures the measured signals outputted from the sensors 18, 20, 22, and 24 in step S100. Next, the drive support ECU 26 performs image processing of the successively picked-up face images to thereby detect the positions of the irises of both eyes of the driver based on the successively picked-up face images in step S110.

Subsequent to step S110, the drive support ECU 26 determines, based on the positions of the irises, the direction of a gaze point of the driver to which the driver's line of sight is directed.

In this embodiment, the environment detector 10 is equipped with the road map database 12 and the current position sensor 14. For this reason, in step S120, the drive support ECU 26 recognizes, based on the road map data stored in the road map database 12 and the current position of the vehicle determined by the current position sensor 14, the running environmental field around the vehicle, such as the shape of a road running in the direction of forward travel of the vehicle from the current position. Then, in step S120, the drive support ECU 26 sets, in the recognized running environmental field around the vehicle, the gaze point of the driver based on the determined direction of the gaze point of the driver to which the driver's line of sight is directed.

Following step S120, the drive support ECU 26 performs a rotational-component (a component of curl) calculating process set forth above in step S130. How to perform the rotational-component calculating process will be described in detail hereinafter.

First, the drive support ECU 26 sets a plurality of points P in a predetermined area AL, such as an area AL that the driver can visibly recognize, in the recognized running environmental field in step S130a. In other words, the plurality of points P represents the recognized running environmental field around the vehicle.

Figure 2B:
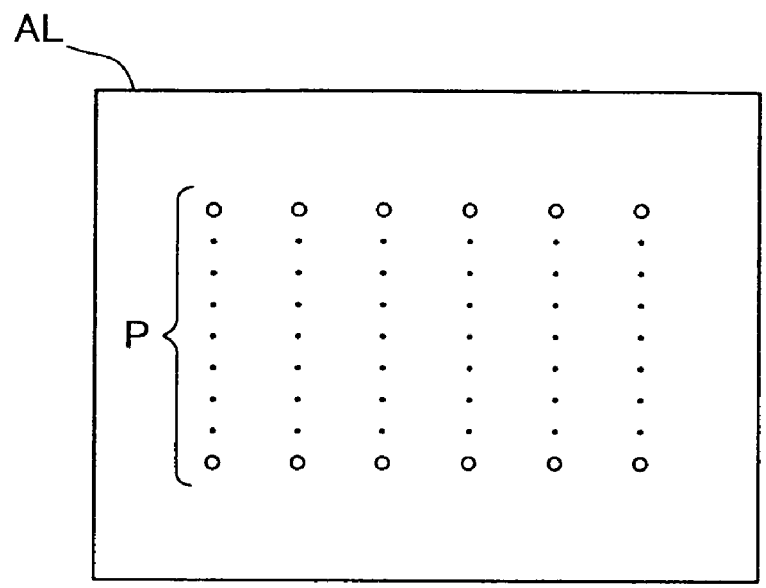
FIG. 2B is a view schematically illustrating a plurality of points set in a predetermined area in a running environmental field around a vehicle according to the embodiment.

The shape formed by the arrangement of the plurality of points P can be a matrix pattern, a concentric pattern, a concentric ellipsoidal pattern, or the like. For example, FIG. 2B schematically illustrates a matrix pattern of the plurality of points P in the area AL in the running environmental field.

Note that the plurality of points P can be set such that a positional relationship between each point P and the vehicle is continuously constant, or they can be fixedly set in the running environment field such that a relative positional relationship between each point P and the vehicle varies with travel of the vehicle. If the plurality of points P are fixedly set in the running environment field such that a relative positional relationship between each point P and the vehicle varies with travel of the vehicle, when some points P at a near side of the vehicle disappear from the area AL, corresponding points P are newly set at a far side of the vehicle. This maintains the number of points P constant irrespective of travel of the vehicle.

Subsequent to step S130a, the drive support ECU 26 detects, based on the measured signals of the lateral acceleration sensor 18, vertical acceleration sensor 20, speed sensor 22, and yaw rate sensor 24, motion of the vehicle in step S130b. Then, in step S130b, the drive support ECU 26 converts the detected motion of the vehicle into relative motion of the running environmental field with respect to the vehicle, that is, converts the detected motion of the vehicle into relative motion of each point P with respect to the vehicle, thus detecting the relative motion of each point P with respect to the vehicle. That is, because the flow (motion) of the running environmental field (road) visibly recognized by the driver results from relative motion between the driver and the running environmental field, it is possible to detect the relative motion of each point P with respect to the vehicle based on the motion of the vehicle.

Following step S130b, the drive support ECU 26 projects the relative motion of each point P in a three-dimensional coordinate system formed by modeling a retina sphere of the driver of the vehicle assuming that the driver observes the gaze point closely in step S130c; the three-dimensional coordinate system will be referred to as a "retina-sphere coordinate system".

Then, the drive support ECU 26 calculates a component of curl of the projected relative motion of each point P; the component of curl of the projected relative motion of each point P represents a rotational component of the projected relative motion of a corresponding point P around a corresponding driver's eye direction to the gaze point in step S130d. That is, the calculator 26e calculates rotational components in the relative flow of the environmental field visually recognized by the driver; the rotational components of the relative flow of the environmental field are each relatively rotated around the gaze point with respect to the driver in step S130d.

Figure 3A:
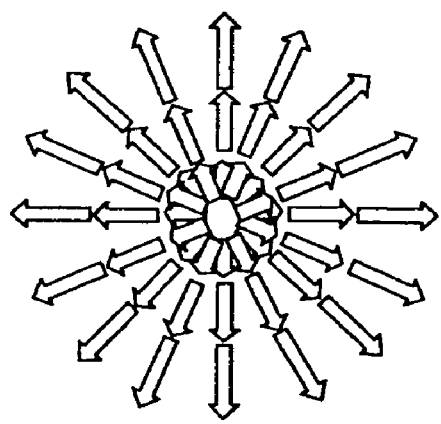
FIG. 3A is a view schematically illustrating components of divergence radially expanding from a gaze point according to the embodiment.
Figure 3B:
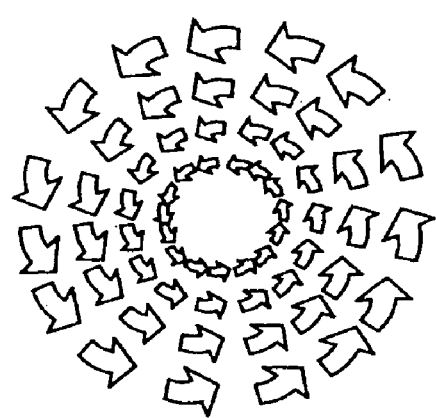
FIG. 3B is a view schematically illustrating components of curl rotated around the gaze point according to the embodiment.

Specifically, while the vehicle is running, the driver of the vehicle is visually aware of the motion of the vehicle by visually recognizing the flow of the environmental field around the vehicle. The flow of the environmental field visually recognizable includes components of divergence (diverging components) radially expanding from the gaze point (see FIG. 3A), and components of curl (rotational components) rotated around the gaze point (see FIG. 3B).

In step S130d, the drive support ECU 26 calculates the component of curl of each point P using the following procedure.

Figure 4A:
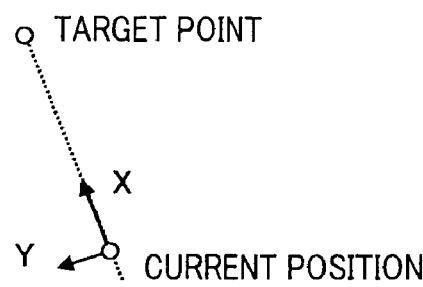
FIG. 4A is a view schematically illustrating a relationship between an X axis and a Y axis of an orthogonal coordinate system set by the drive support ECU according to the embodiment.
Figure 4B:
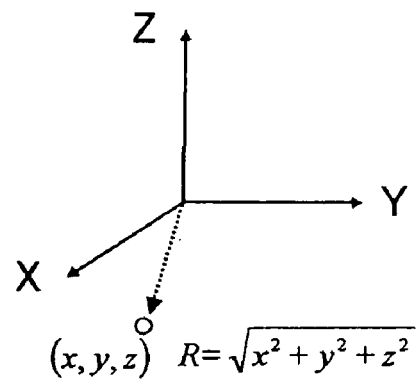
FIG. 4B is a view schematically illustrating the orthogonal coordinate system set by the drive support ECU according to the embodiment.

First, the drive support ECU 26 defines, in the storage medium 26a, an orthogonal coordinate system by setting: the gaze point to a target point, a direction from the current position of the vehicle (the driver's eye-point position) toward the target point to the X axis, a direction orthogonal to the X axis and extending in the lateral direction of the vehicle to the Y axis, and a direction orthogonal to the X and Y axes and extending in the vertical direction of the vehicle to the Z axis (see FIG. 4A). Next, as illustrated in FIG. 4B, the drive support ECU 26 obtains coordinates (x, y, z) of the plurality of points P.

Figure 4C:
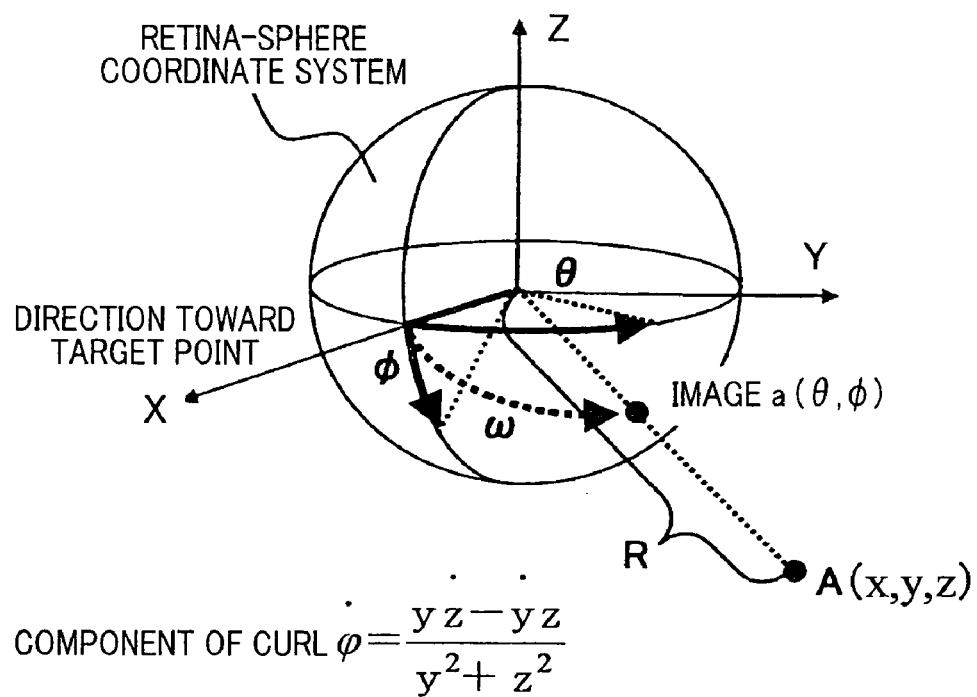
FIG. 4C is a view schematically illustrating a relationship between the orthogonal coordinate system and a retina-sphere coordinate system defined by the drive support ECU according to the embodiment.

As illustrated in FIG. 4C, the relative motion of a point A with a coordinate (x, y, z) at a distance R from the origin of the orthogonal coordinate system is projected in the retina-sphere coordinate system (see step S130c). Note that the point A in the orthogonal coordinate system is converted into a point (an image) a $(\theta, \phi)$ in the retina-sphere coordinate system; $\theta$ represents the azimuth angle from the X axis on the XY plane formed by the X axis and Y axis, and $\phi$ represents the elevation angle from the X axis on the XZ plane formed by the X axis and the Z axis.

Then, the drive support ECU 26 calculates a component $\dot{\phi}$ of curl of the projected relative motion of the point A in the retina-sphere coordinate system in the following equation [1]:

$$\dot{\phi} = \frac{y\dot{z} - z\dot{y}}{y^2 + z^2} \quad [1]$$

where dot (•) over a letter represents the time derivative 'd/dt (time).

That is, because the direction of the driver's line of sight to the gaze point is set as the X axis, a component of curl (rotation) around the X axis can be calculated, based on y and z coordinates and y- and z-axis components of the vehicle speed, as the magnitude of the vehicle speed in the YZ plane formed by the Y axis and Z axis. The y-axis component of the vehicle speed in the Y-axis direction extending in the lateral direction of the vehicle can be obtained based on the measured signal outputted from the lateral acceleration sensor 18. Similarly, the z-axis component of the vehicle speed in the Z-axis direction extending in the vertical direction of the vehicle can be obtained based on the measured signal outputted from the vertical acceleration sensor 20.

The drive support ECU 26 calculates the component of curl of the projected relative motion of each point P in the same manner as the point A in step S130d.

After completion of the calculation of the component of curl of the projected relative motion of each point P, the drive support ECU 26 proceeds to step S140, and determines, based on the calculated components of curl of the projected relative motions of the respective points P, a target trajectory of the vehicle in step S140. How to determine the target trajectory of the vehicle based on the calculated components of curl of the projected relative motions of the respective points P in step S140 will be described in detail hereinafter.

The inventors of this application has focused on the fact that, when the vehicle goes into a curve in the road from a straight portion therein, the component of curl of the projected relative motion of each point P dynamically changes depending on change of the shape of the road and change of the driver's gaze point. Specifically, if the road curves to the right so that the gaze point of the driver is set on the curve of the road (see FIG. 5), the magnitude levels of some of the points P close to the right side of the road are larger than those of the remaining points, and the magnitude levels of the points P are gradually reduced from the right side of the road to the left side thereof.

Figure 5:
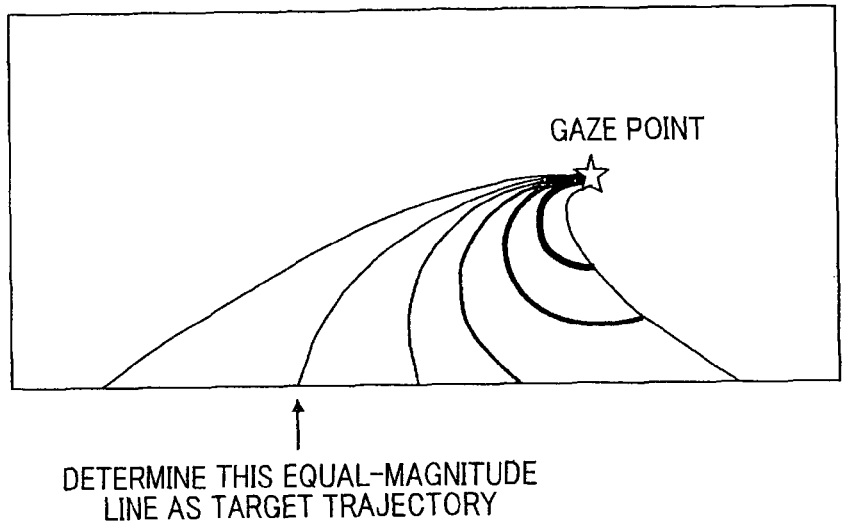
FIG. 5 is a view schematically illustrating equal-magnitude lines according to the embodiment.

In contrast, if the road curves to the left so that the gaze point of the driver is set on the curve of the road, the magnitude levels of some of the points P close to the left side of the road are larger than those of the remaining points, and the magnitude levels of the points P are gradually reduced from the left side of the road to the right side thereof. Note that, in FIG. 5, five equal-magnitude lines each connecting points whose components of curl are the same as each other are illustrated. The thickness of each of the five equal-magnitude lines demonstrates a corresponding magnitude level. FIG. 5 clearly shows that the equal-magnitude line located closest to the right side of the road is the thickest in the five equal-magnitude lines, so that it has the highest magnitude level therein.

As described above, the distribution of the magnitude levels of the points P dynamically changes depending on change of the shape of the road and/or change of the gaze point due to the change of the shape of the road. In addition, the distribution of the magnitude levels of the points P varies from one side on the road in its width direction to the other side thereon. Thus, the equal-magnitude lines each connecting points whose components of curl are the same as each other are suitable for the target trajectory of the vehicle.

Thus, in step S140, the drive support ECU 26 determines one of the equal-magnitude lines as the target trajectory of the vehicle. Thus, even if the vehicle turns with its turning radius being changed, the drive support ECU 26 suitably determines the target trajectory of the vehicle based on the equal-magnitude lines because the distribution of the magnitude levels of the points P dynamically changes depending on change of the turning radius of the vehicle.

Preferably, in step S140, the drive support ECU 26 determines, as the target trajectory of the vehicle, one of the equal-magnitude lines, which extends from the front end of the vehicle. This enables support of drive of the vehicle with its current trajectory maintained.

Figure 6:
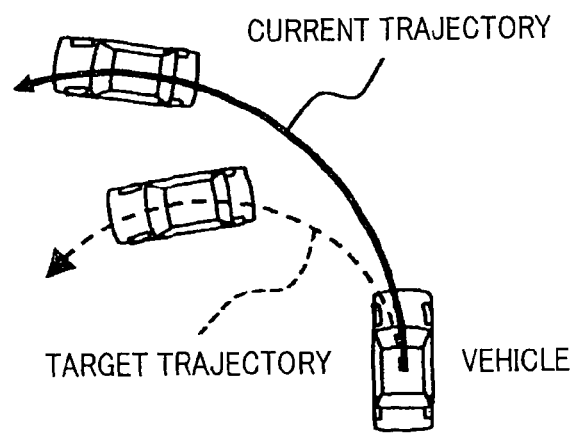
FIG. 6 is a view schematically illustrating that the curvature radius of the current trajectory is greater than that of the target trajectory so that the vehicle tends to understeer according to the embodiment.
Figure 7:
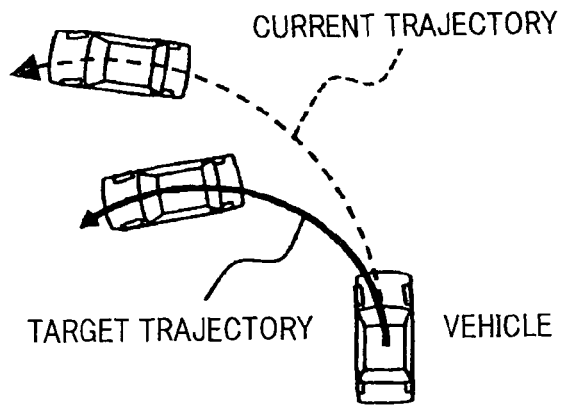
FIG. 7 is a view schematically illustrating that the curvature radius of the current trajectory is smaller than that of the target trajectory so that the vehicle tends to oversteer (see FIG. 7), the drive support ECU 26 reduces the assist torque in step S160 according to the embodiment.

Note that the target trajectory of the vehicle determined based on the equal-magnitude lines is in the retina-sphere coordinate system. Thus, in order to easily compare the target trajectory of the vehicle with a current trajectory of the vehicle, the drive support ECU 26 converts the target trajectory of the vehicle in the retina-sphere coordinate system into a target trajectory of the vehicle in an orthogonal coordinate system whose one axis, such as the Y axis, is aligned with the travel direction of the vehicle. FIGS. 6 and 7 illustrate two examples of the target trajectory converted in the orthogonal coordinate system, respectively.

Following step S140, the drive support ECU 26 calculates, based on the vehicle speed and the yaw rate, which are currently measured by the corresponding sensors 22 and 24, a current trajectory of the vehicle assuming that a current steering condition defined based on the currently measured vehicle speed and the yaw rate is kept intact with time in step S150. Alternatively, the current trajectory can be defined as an extension of the preceding trajectory. In addition, the drive support ECU 26 can calculate the current trajectory based on a current steering angle of the steering wheel in place of or in addition to the yaw rate.

Subsequent to step S150, the drive support ECU 26 compares the target trajectory with the current trajectory, and if the target trajectory is different from the current trajectory, the drive support ECU 26 controls the trajectory of the vehicle so that the current trajectory is matched with the target trajectory in step S160.

Specifically, in step S160, the drive support ECU 26 adjusts the assist torque such that the current trajectory is substantially matched with the target trajectory.

For example, if the curvature radius of the current trajectory is greater than that of the target trajectory so that the vehicle tends to understeer (see FIG. 6), the drive support ECU 26 increases the assist torque in step S160. On the other hand, if the curvature radius of the current trajectory is smaller than that of the target trajectory so that the vehicle tends to oversteer (see FIG. 7), the drive support ECU 26 reduces the assist torque in step S160.

Next, the drive support ECU 26 determines whether the control switch 30 is turned OFF, in other words, no trigger signal is inputted from the control switch 30 in step S170.

Until the determination of step S170 is affirmative (YES), the drive support ECU 26 cyclically performs the drive support task from step S100 to S170. When the determination of step S170 is affirmative (YES), the drive support ECU 26 terminates the drive support task.

In step S160, the drive support ECU 26 can change the steering characteristics of the vehicle to thereby control the trajectory of the vehicle.

The steering characteristics can be changed by changing the front-rear load balance of the vehicle. Shifting the load balance frontward improves the steering characteristics. Thus, as illustrated in FIG. 6, if the curvature radius of the current trajectory is greater than that of the target trajectory so that the vehicle tends to understeer (see FIG. 6), the drive support ECU 26 can shift the load toward the front-wheel side. On the other hand, if the load balance is shifted to the rear-wheel side, the stability of the vehicle is improved. Thus, if the curvature radius of the current trajectory is smaller than that of the target trajectory so that the vehicle tends to oversteer (see FIG. 7), the drive support ECU 26 can shift the load toward the rear-wheel side of the vehicle. Various methods can be used to shift the front-rear load balance of the vehicle. For example, control of the driving force and/or the braking force, or management of stability factors can shift the front-rear load balance.

Note that, in step S160, in consideration of control delay, as illustrated in FIG. 8, the drive support ECU 26 preferably compares a future position of the vehicle after a lapse of N seconds on the current trajectory with a future position of the vehicle after a lapse of N seconds on the target trajectory, and controls the trajectory of the vehicle based on the deviation between the future position of the vehicle on the current trajectory and that of the vehicle on the target trajectory.

As described above, the drive support apparatus AP installed in a vehicle according to this embodiment is configured to calculate a component of curl in relative motion of each point P; the component of curl in the relative motion of each point P represents a rotational component of the relative motion of a corresponding point P around a corresponding driver's eye direction to the gaze point. The drive support apparatus AP according to this embodiment is also configured to determine, as the target trajectory of the vehicle, one of the equal-magnitude lines each connecting points whose components of curl are the same as each other.

Thus, even if the vehicle turns with its turning radius being changed, the configuration of the drive support apparatus AP suitably determines the target trajectory of the vehicle based on the equal-magnitude lines because the distribution of the magnitude levels of the points P dynamically changes depending on change of the turning radius of the vehicle.

The present disclosure is not limited to the embodiment set forth above, and can be modified or deformed within the scope of the present disclosure.

In this embodiment, the drive support apparatus AP is equipped with the face image camera 32 to successively pick up face images of the driver of the vehicle, and the drive support apparatus AP is configured to detect the positions of the irises of both eyes of the driver based on the successively picked-up face images, and set, based on the positions of the irises, the gaze point of the driver. However, the present disclosure is not limited to the configuration.

Specifically, the drive support apparatus AP can be provided with a front camera 32a mounted on the vehicle (see phantom lines in FIG. 1), and can be configured to represent motion of each of a plurality of points set in an image picked up by the front camera as a vector, that is, an optical flow, and set, as the gaze point, one point with the minimum optical flow. This is because, based on psychological theories and other findings as wall as empirical knowledge, the driver is known to gaze at a point that least moves in the driver's sight. In this case, the determiner (gaze setter) 26c can calculate the optical flow at each of the plurality of points, or can calculate the optical flows at some of the plurality of points; these points at which the optical flows are calculated are limited to be present on the road. One point with the minimum optical flow can be selected as the gaze point in some of the plurality of points; these points as candidate points of the gaze point are limited to be present on the road.

In step S120, the drive support ECU 26 can convert the detected motion of the vehicle by the vehicle motion detector 160 into relative motion of the running environmental field with respect to the vehicle, that is, can convert the detected motion of the vehicle into relative motion of each of a plurality of points P set in the predetermined area AL in the recognized running environmental field with respect to the vehicle, thus detecting the relative motion of each point P with respect to the vehicle. Based on the relative motion of each point P, the drive support ECU 26 can set, as the gaze point, one point with the minimum relative motion with respect to the vehicle.

In this modification, assuming that the driver of the vehicle views in the travel direction of the vehicle, the drive support ECU 26 can project the relative motion of each point P in the retina-sphere coordinate system formed by modeling the retina sphere of the driver of the vehicle. Then, the drive support ECU 26 calculates an amount of the projected relative motion of each point P; the amount of observed relative motion of each point P.

In FIG. 9 corresponding to FIG. 4C, an orthogonal coordinate system is defined by setting: the travel direction of the vehicle to the Y axis, a direction orthogonal to the Y axis and extending in the lateral direction of the vehicle to the X axis, and a direction orthogonal to the X and Y axes and extending in the vertical direction of the vehicle to the Z axis. Next, as illustrated in FIG. 9, the drive support ECU 26 obtains coordinates (x, y, z) of the plurality of points P.

As illustrated in FIG. 9, the relative motion of a point A with a coordinate (x, y, z) at a distance R from the origin of the orthogonal coordinate system is projected in the retina-sphere coordinate system. Note that the point A in the orthogonal coordinate system is converted into a point (an image) a ($\theta$, $\phi$) in the retina-sphere coordinate system; $\theta$ represents the azimuth angle from the X axis on the XY plane formed by the X axis and Y axis, and $\phi$ represents the elevation angle from the X axis on the XZ plane formed by the X axis and the Z axis.

That is, in step S120, the drive support ECU 26 calculates, as the observed motion, an absolute change rate of eccentric angle $\omega$ of the image a in accordance with the following equation [2]:

$$\dot{\omega} = \frac{V}{R}\sqrt{1 - \cos^2\theta \cdot \cos^2\phi} + \gamma \cdot \frac{\sin\theta \cdot \cos\phi}{\sqrt{1 - \cos^2\theta \cdot \cos^2\phi}} \quad [2]$$

where V represents the speed of the vehicle, and $\gamma$ represents the yaw rate.

The equation [2] is derived in the following manner. The eccentric angle $\omega$ is represented by using the azimuth angle $\theta$ and the elevation angle $\theta$ as shown in the following equation [3]:

$$\omega = \cos^{-1}(\cos\phi \cos\theta) \quad [3]$$

In addition, the relationship between the angle $\theta$, the angle $\phi$, together with the eccentric $\omega$ in the retina coordinate system and the coordinates (x, y, z) in the orthogonal coordinate system illustrated in FIG. 9 is represented by the following equations [4] to [8]:

$$\theta = \tan^{-1}\left(\frac{x}{y}\right) \quad [4]$$

$$\phi = \tan^{-1}\left(\frac{z}{\sqrt{x^2 + y^2}}\right) \quad [5]$$

$$x = y \cdot \tan\theta \quad [6]$$

$$y = R \cdot \cos\omega \quad [7]$$

$$z = \sqrt{x^2 + y^2} \cdot \tan\phi \quad [8]$$

Moreover, when the formula shown as the following equation [9] is employed to differentiate the equation [3], the following equation [10] is derived:

$$(\cos^{-1} x)' = \frac{1}{\sqrt{1 - x^2}} \quad [9]$$

$$\dot{\omega} = \frac{1}{\sqrt{1 - (\cos\theta \cdot \cos\phi)^2}} \cdot \left(-\sin\theta \cdot \cos\phi \cdot \dot{\theta} - \cos\theta \cdot \sin\phi \cdot \dot{\phi}\right) \quad [10]$$

$$= \frac{-(\sin\theta \cdot \cos\phi)}{\sqrt{1 - (\cos\theta \cdot \cos\phi)^2}} \cdot \dot{\theta} + \frac{-(\cos\theta \cdot \sin\phi)}{\sqrt{1 - (\cos\theta \cdot \cos\phi)^2}} \cdot \dot{\phi}$$

$$= \alpha(\theta, \phi) \cdot \dot{\theta} + \beta(\theta, \phi) \cdot \dot{\phi}$$

When the vehicle speed V and the yaw rate $\gamma$ are taken into consideration, the differentiated values of $\theta$ and $\phi$ are calculated, based on the equations [4] and [5], as the following equations [11] and [12]:

$$\dot{\phi} = \frac{1}{1 + \left(\frac{z}{x^2 + y^2}\right)^2}\left(\frac{z}{\sqrt{x^2 + y^2}}\right)' \quad [11]$$

$$= \frac{x^2 + y^2}{x^2 + y^2 + z^2}\left\{\frac{-z(x\dot{x} + y\dot{y}) + \dot{z}(x^2 + y^2)}{(x^2 + y^2)^{\frac{3}{2}}}\right\}$$

$$= \frac{-zx\dot{x}}{(x^2 + y^2 + z^2)\sqrt{x^2 + y^2}}$$

$$= -\frac{R\sin\phi \cdot R\cos\phi\cos\theta \cdot V}{R^2 R\cos\phi}$$

$$= -\frac{V}{R}\cos\theta\sin\phi$$

$$\dot{\theta} = \frac{1}{1 + \left(\frac{x}{y}\right)^2}\left(\frac{x}{y}\right)' + \gamma \quad [12]$$

$$= \frac{\dot{x}y - x\dot{y}}{x^2 + y^2} + \gamma$$

$$= \frac{-VR\cos\phi \cdot \sin\theta}{R^2 \cos^2\phi} + \gamma$$

$$= \frac{-V\sin\theta}{R\cos\phi} + \gamma$$

Substitution of the equations [11] and [12] into the equation [10] establishes the equation [2].

In step S120, the drive support ECU 26 can successively calculate, in accordance with the equation [2], the change rates of the respective points P using the positions ($\theta$, $\phi$), the distance R, the vehicle speed V, and the yaw rate $\gamma$. The change rate of each point P represents the amount of relative motion in the driver's visual sensation because it is calculated based on the retina-sphere coordinate system. That is, the drive support ECU 26 can convert physical relative motion of each point P set in the predetermined area AL into visual relative motion.

In step S120, the drive support ECU 26 sets the gaze point of the driver based on the change rate of the eccentric angle of each of the points P. Specifically, FIG. 10 schematically illustrates the absolute values of the eccentric-angle change rates of the respective points P, each of which is represented by a segment having a proportional length. As illustrated in FIG. 10, the drive support ECU 26 searches all of the absolute values of the eccentric-angle change rates for finding the minimum absolute value of a point P as the gaze point.

Note that, because the driver assumes to gaze at a point on the road while running the vehicle, a position of the gaze point can be limited on the road in front of the vehicle.

In the aforementioned embodiment, the drive support apparatus AP detects motion of the vehicle, and converts the detected motion of the vehicle into relative motion of the running environment field with respect to the vehicle, but the present disclosure is not limited thereto.

Specifically, the drive support apparatus AP can be configured to, using an object detecting unit, such as a millimeter laser, a laser radar, and a stereo camera, detect positional information, such as an azimuth direction and a distance from the vehicle, of at least one stationary object existing in the running environmental field, thus detecting motion of the at least one stationary object. As the at least one stationary object to be detected, a point on the road surface in front of the vehicle, a guardrail, a marker, or the like can be used. The drive support apparatus AP can detect relative motion of the at least one stationary object in the retina-sphere coordinate system based on the positional information of the at least one stationary object.

In the aforementioned embodiment, the drive support apparatus AP projects, in the retina-sphere coordinate system, the relative motion of each of the plurality of points P set in the area AL in the running environmental field, and calculates a component of curl of the projected relative motion of each point P, but the present disclosure is not limited thereto.

Specifically, because a target trajectory should be set on the road on which the vehicle is estimated to run, the plurality of points P can be set on the road on which the vehicle is estimated to run. This reduces processing load of the drive support ECU 26.

The target trajectory can be displayed on a display unit, such as a head-up display or the like without execution of the trajectory control of the vehicle.

In the aforementioned embodiment, the vehicle is used as an example of mobile objects of the present disclosure. However, other types of mobile objects, such as an aircraft, a motorcycle, a wheelchair, and the like can also be used as the mobile object of the present disclosure.

While an illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those in the art based on the present disclosure. The limitations in the claims are to be interpreted broadly based on the language employed in the claims and not limited to examples described in the present specification or during the prosecution of the application, which examples are to be constructed as non-exclusive.

What is claimed is:

1. A drive supporting apparatus comprising:
a gaze point setter that sets a gaze point of a driver of a mobile object;
a motion detector that detects motion of an environmental field around the mobile object with respect to the driver of the mobile object;
a curl component calculator that:
projects the motion of the environmental field detected by the motion detecting means in a coordinate system, the coordinate system being formed by modeling a retina sphere of the driver of the mobile object, and
calculates each of rotational components of the projected motion of the environmental field around an axis, the axis being an eye direction of the driver of the mobile object to the gaze point;
a target trajectory setter that sets, as a target trajectory of the mobile object, an equal-potential line of a part of the rotational components of the projected motion of the environmental field, the part of the rotational components having a same magnitude; and
a supporter that supports drive of the mobile object based on the target trajectory of the mobile object set by the target trajectory setter.

2. The drive supporting apparatus according to claim 1, wherein the target trajectory setter sets an equal-potential line extending from a front end of the mobile object to the gaze point as the target trajectory of the mobile object.

3. The drive supporting apparatus according to claim 1, wherein the motion detector comprises an object detector that detects positions of objects existing in the environmental field around the mobile object as the environmental field, the motion detector detecting the motion of the environmental field with respect to the driver of the mobile object based on a detected position of a stationary object in the positions detected by the object detector.

4. The drive supporting apparatus according to claim 1, wherein the gaze point setter sets, as the gaze point, a point of the projected motion of the environmental field, when the motion of the environmental field detected by the motion detector is projected in the coordinate system formed by modeling the retina sphere of the driver of the mobile object, the projected motion of the environmental field being minimized at the point set as the gazes point.

5. The drive supporting apparatus according to claim 1, further comprising a driver camera that picks up an image of the driver, the image including an eye of the driver, wherein the gaze point setting means setter analyzes the image including the eye of the driver picked up by the driver camera, thus setting the gaze point.

6. The drive supporting apparatus according to claim 1, further comprising a front camera installed in the mobile object and configured to successively pick up images in a travelling direction of the vehicle, wherein the gaze point setting means setter sets the gaze point based on optical flows in the picked-up images by the front camera.

7. The drive supporting apparatus according to claim 1, wherein the supporter calculates a current trajectory of the mobile object based on a current motion condition of the mobile object, and controls a trajectory of the mobile object based on a result of a comparison between the current trajectory and the target trajectory.

8. The drive supporting apparatus according to claim 1, wherein the mobile object is a vehicle that travels on a road, and the motion detector sets a plurality of points on a surface of the road in a travelling direction of the vehicle as the environmental field of the mobile object, and detects motion of each of the plurality of points with respect to the mobile object as the relative motion of the environmental field around the mobile object.

9. The drive supporting apparatus according to claim 8, wherein the target trajectory setter sets an equal-potential line extending from a front end of the mobile object to the gaze point as the target trajectory of the mobile object.

10. The drive supporting apparatus according to claim 8, wherein the motion detector comprises an object detector that detects positions of objects existing in the environmental field around the mobile object as the environmental field, the motion detector detecting the motion of the environmental field with respect to the driver of the mobile object based on a detected position of a stationary object in the positions detected by the object detector.

11. The drive supporting apparatus according to claim 8, wherein the gaze point setter sets, as the gaze point, a point of the projected motion of the environmental field, when the motion of the environmental field detected by the motion detector is projected in the coordinate system formed by modeling the retina sphere of the driver of the mobile object, the projected motion of the environmental field being minimized at the point set as the gazes point.

12. The drive supporting apparatus according to claim 8, further comprising a driver camera that picks up an image of the driver, the image including an eye of the driver, wherein the gaze point setting means setter analyzes the image including the eye of the driver picked up by the driver camera, thus setting the gaze point.

13. The drive supporting apparatus according to claim 8, further comprising a front camera installed in the mobile object and configured to successively pick up images in a travelling direction of the vehicle, wherein the gaze point setting means setter sets the gaze point based on optical flows in the picked-up images by the front camera.

14. The drive supporting apparatus according to claim 8, wherein the supporter calculates a current trajectory of the mobile object based on a current motion condition of the mobile object, and controls a trajectory of the mobile object based on a result of a comparison between the current trajectory and the target trajectory.

15. The drive supporting apparatus according to claim 8, wherein the motion detector comprises:
 a road map storing unit that stores therein a road map;
 a current position detector that detects a current position of the vehicle; and
 a vehicle-motion detector that detects motion of the vehicle in a lateral direction of the vehicle, and detects motion of the vehicle in a vertical direction of the vehicle,
 wherein the motion detector detects relative motion of each of the plurality of points with respect to the mobile object in a virtual running environmental field based on the detected motion of the vehicle in the lateral direction and the detected motion of the vehicle in the vertical direction, the virtual running environmental field being defined based on the road map and the detected current position of the vehicle.

16. The drive supporting apparatus according to claim 15, wherein the target trajectory setter sets an equal-potential line extending from a front end of the mobile object to the gaze point as the target trajectory of the mobile object.

17. The drive supporting apparatus according to claim 15, wherein the motion detector comprises an object detector that detects positions of objects existing in the environmental field around the mobile object as the environmental field, the motion detector detecting the motion of the environmental field with respect to the driver of the mobile object based on a detected position of a stationary object in the positions detected by the object detector.

18. The drive supporting apparatus according to claim 15, wherein the gaze point setter sets, as the gaze point, a point of the projected motion of the environmental field, when the motion of the environmental field detected by the motion detector is projected in the coordinate system formed by modeling the retina sphere of the driver of the mobile object, the projected motion of the environmental field being minimized at the point set as the gazes point.

19. The drive supporting apparatus according to claim 15, further comprising a driver camera that picks up an image of the driver, the image including an eye of the driver, wherein the gaze point setting means setter analyzes the image including the eye of the driver picked up by the driver camera, thus setting the gaze point.

20. The drive supporting apparatus according to claim 15, further comprising a front camera installed in the mobile object and configured to successively pick up images in a travelling direction of the vehicle, wherein the gaze point setting means setter sets the gaze point based on optical flows in the picked-up images by the front camera.

21. The drive supporting apparatus according to claim 15, wherein the supporter calculates a current trajectory of the mobile object based on a current motion condition of the mobile object, and controls a trajectory of the mobile object based on a result of a comparison between the current trajectory and the target trajectory.

* * * * *